(12) United States Patent
Hong

(10) Patent No.: US 11,287,649 B2
(45) Date of Patent: Mar. 29, 2022

(54) DISPLAY DEVICE AND DISPLAY METHOD

(71) Applicant: BOE Technology Group Co., Ltd., Beijing (CN)

(72) Inventor: Tao Hong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 352 days.

(21) Appl. No.: 16/511,411

(22) Filed: Jul. 15, 2019

(65) Prior Publication Data

US 2020/0150429 A1    May 14, 2020

(30) Foreign Application Priority Data

Nov. 9, 2018   (CN) .......................... 201811333377.3

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 27/283* (2013.01);
(Continued)

(58) Field of Classification Search
CPC .............. G02B 27/0101; G02B 27/283; G02B 27/286; B60K 2370/1529; B60K 35/00; G02F 1/0136; G02F 1/03
See application file for complete search history.

(56) References Cited

U.S. PATENT DOCUMENTS

2007/0081256 A1   4/2007   Travers
2007/0188864 A1*  8/2007   Duncan ................. C08F 265/04
                                                       359/489.11
(Continued)

FOREIGN PATENT DOCUMENTS

CN         102253497 A     11/2011
CN         108181708 A      6/2018
WO    WO-2015190157 A1 *  12/2015  ........... G02B 27/283

OTHER PUBLICATIONS

Machine translation of WO-2015190157-A1, retrieved from PE2E Search Aug. 25, 2021 (Year: 2021).*

(Continued)

*Primary Examiner* — Cara E Rakowski
(74) *Attorney, Agent, or Firm* — Westman, Champlin & Koehler, P.A.

(57) ABSTRACT

A display device and a display method are provided, the display device including: a light source assembly, configured to output a first light ray carried with a first image to be displayed and a second light ray carried with a second image to be displayed, alternately; a first conversion element, arranged at a light exiting side of the light source assembly, and configured to convert the first light ray carried with the first image to be displayed into a first polarization light, and to convert the second light ray carried with the second image to be displayed into a second polarization light; and a light-splitting assembly and a imaging reflecting element, the light-splitting assembly being configured to direct the converted first light ray originating from the first conversion element towards the imaging reflecting element in a first direction, and to direct the converted second light ray originating from the first conversion element towards the imaging reflecting element in a second direction different from the first direction, and the imaging reflecting element being configured to receive and reflect the first light ray (Continued)

propagating in the first direction and the second light ray propagating in the second direction so as to form the first image and the second image, respectively; the first image and the second image are located at different distances from the imaging reflecting element in a same direction with respect to a predetermined observation location respectively.

14 Claims, 2 Drawing Sheets

(51) Int. Cl.
    *G02B 27/28* (2006.01)
    *G02F 1/01* (2006.01)
    *G02F 1/03* (2006.01)
(52) U.S. Cl.
    CPC ......... *G02B 27/286* (2013.01); *G02F 1/0136* (2013.01); *G02F 1/03* (2013.01); *B60K 2370/1529* (2019.05); *B60K 2370/166* (2019.05); *B60K 2370/167* (2019.05); *B60K 2370/176* (2019.05); *B60K 2370/31* (2019.05)

(56) References Cited

U.S. PATENT DOCUMENTS

2009/0009455 A1* 1/2009 Kimura ................ G09G 3/2074
                                                      345/89
2019/0204491 A1 7/2019 Hong

OTHER PUBLICATIONS

First Office Action, including Search Report, for Chinese Patent Application No. 201811333377.3, dated Jul. 3, 2020, 17 pages.
Second Office Action, including search report, for Chinese Patent Application No. 201811333377.3, dated Feb. 19, 2021, 18 pages.

* cited by examiner

DISPLAY DEVICE AND DISPLAY METHOD

CROSS-REFERENCE TO RELATED APPLICATION

The present disclosure claims the benefit of Chinese Patent Application Invention No. 201811333377.3 filed on Nov. 9, 2018 in the State Intellectual Property Office of China, the whole disclosure of which is incorporated herein by reference.

BACKGROUND

Field

Embodiments of the present disclosure generally relate to the technical field of display technology, and in particular, to a display device and a display method.

Description of the Related Art

With a development in science and technology, a head up display (abbreviated as UHD) technology has been widely used in the automobile technical field. In a course of driving, the head up display technology projects important information (e.g., vehicle speed) and navigation information which are displayed on automotive instruments, onto a front windshield glass in the form of images, and forms virtual images (e.g., virtual images presented in a suspension manner above an engine cover in front of driver who is seated within a cab of the vehicle) through a reflection of the front windshield glass, such that the driver can see the information carried by the virtual images without lowering head to observe, facilitating avoiding any traffic accident caused by the driver looking down to observe the automotive instruments.

In the related head up display device, a flat image (2D image) is projected to a location at a fixed distance in front of the driver (e.g., at the front windshield glass), and the driver needs to adjust the focal length of eyes of his or her own upon looking at the image displayed by the head up display, such that the focus is located on a plane where the image is located.

However, viewing a plane with a fixed focal length for a long time may cause eye fatigue which may thus be adverse to safe driving. In addition, the flat image may not display part of the information well, such as steering information during navigation, superposition information of other markers, and the like.

SUMMARY

The embodiments of the present disclosure have been made to overcome or alleviate at least one aspect of the above mentioned disadvantages and/or shortcomings in the prior art, by providing a display device and a display method.

Following technical solutions are adopted in exemplary embodiments of the invention.

According to one aspect of embodiments of the disclosure, there is provided display device, comprising: a light source assembly, configured to output a first light ray carried with a first image to be displayed and a second light ray carried with a second image to be displayed, alternately in timing, depending on a predetermined timing sequence; a first conversion element, arranged at a light exiting side of the light source assembly, and configured to convert the first light ray which originates from the light source assembly and is carried with the first image to be displayed into a first polarization light, and to convert the second light ray which originates from the light source assembly and is carried with the second image to be displayed into a second polarization light; and a light-splitting assembly and a imaging reflecting element, the light-splitting assembly being configured to split light rays to direct the converted first light ray originating from the first conversion element towards the imaging reflecting element in a first direction, and to direct the converted second light ray originating from the first conversion element towards the imaging reflecting element in a second direction different from the first direction, and the imaging reflecting element being configured to receive and reflect the first light ray propagating in the first direction and the second light ray propagating in the second direction so as to form the first image by the first light ray and the second image by the second light ray, respectively; the first image and the second image are located in a same direction with respect to a predetermined observation location, and the first image and the second image are located at different distances from the imaging reflecting element, respectively.

According to an exemplary embodiment of the present disclosure, the first polarization light is a first linearly polarized light and the second polarization light is a second linearly polarized light having a polarization direction perpendicular to that of the first linearly polarized light.

According to an exemplary embodiment of the present disclosure, the light-splitting assembly further comprises: a polarization light-splitting element, which is configured to reflect the converted first light ray originating from the first conversion element in the first direction and to transmit the converted second light ray originating from the first conversion element in the second direction.

According to an exemplary embodiment of the present disclosure, the light-splitting assembly further comprises: a first concave reflecting element, configured to reflect the first light ray originating from the polarization light-splitting element from the first direction towards a third direction so as to form a third light ray propagating in the third direction; and a second concave reflecting element, configured to reflect the second light ray originating from the polarization light-splitting element from the second direction towards a fourth direction so as to form a fourth light ray propagating in the fourth direction; the first concave reflecting element has a curvature radius different from that of the second concave reflecting element.

According to an exemplary embodiment of the present disclosure, the light-splitting assembly further comprises: a first wave plate, arranged between the polarization light-splitting element and the first concave reflecting element in the first direction, and configured to cooperate with the first concave reflecting element to convert the first light ray in a first linearly polarized condition into the third light ray in a second linearly polarized condition; and a second wave plate, arranged between the polarization light-splitting element and the second concave reflecting element in the second direction, and configured to cooperate with the second concave reflecting element to convert the second light ray in the second linearly polarized condition into the fourth light ray in the first linearly polarized condition; the polarization light-splitting element is further configured to transmit the third light ray originating from the first concave reflecting element therethrough, and also configured to reflect the fourth light ray originating from the second concave reflecting element.

According to an exemplary embodiment of the present disclosure, the polarization light-splitting element is in the form of a planar shape, and is arranged at an angle of 45° with respect to each of the first light ray and the second light ray both originating from the first conversion element, and configured to reflect the fourth light ray originating from the second concave reflecting element towards the third direction of the third light ray.

According to an exemplary embodiment of the present disclosure, the display device further comprises a third reflecting element, configured to reflect the third light ray and the fourth light ray both originating from the polarization light-splitting element to the imaging reflecting element.

According to an exemplary embodiment of the present disclosure, the display device further comprises: a second conversion element, configured to convert the third light ray in the second linearly polarized condition, which originates from the polarization light-splitting element, into the third light ray in the first linearly polarized condition; the first linearly polarized condition is s polarization and the second linearly polarized condition is p polarization, with respect to the imaging reflecting element.

According to an exemplary embodiment of the present disclosure, the imaging reflecting element is a front windshield glass of a vehicle.

According to an exemplary embodiment of the present disclosure, the light source assembly comprises: an image rendering unit, configured to generate the first image to be displayed depending on datum of the first image, and to generate the second image to be displayed depending on datum of the second image; and a display unit, arranged to be connected with the image rendering unit, and configured to output the first light ray carried with the first image to be displayed and the second light ray carried with the second image to be displayed, alternately in time sequence.

According to an exemplary embodiment of the present disclosure, the image rendering unit is a display control circuit connected with a control unit of the display device, and is configured to be instructed by the control unit to generate image information of both the first image to be displayed and the second image to be displayed; and the display unit comprises: a light source configured to emit light rays; a light modulator arranged in a direction in which the emitted light rays propagates and configured to modulate the emitted light rays alternately in timing sequence at two different deflection angles to generate the first light ray and the second light ray which are projected alternately in timing sequence in different directions after the emitted light rays transmit through the light modulator; and a display panel arranged downstream the light modulator and configured to be controlled by the control unit to load image information onto the first light ray and the second light ray projected onto the display panel alternately in timing sequence in different directions so as to form the first light ray carried with the first image and the second light ray carried with the second image.

According to an exemplary embodiment of the present disclosure, the light source is a laser comprising a red laser, a green laser and a blue laser.

According to an exemplary embodiment of the present disclosure, the light modulator is a spatial light modulator comprising one of following: a DKDP device utilizing Pockels' effect, a PROM device utilizing Pockels' effect, a liquid crystal light valve utilizing hybrid field effect, or a thermoplastic recording medium utilizing surface deformation or a photoconductive thermoplastic recording medium.

According to an exemplary embodiment of the present disclosure, the display panel is a reflective display, the reflective display being one of following: a DLP display or an Lcos display.

According to an exemplary embodiment of the present disclosure, the first conversion element comprises a linear polarizer and an electro-controlled crystal overlapping each other, the linear polarizer is configured to convert the first light ray and the second light ray, each of which is incident on the first conversion element respectively, into respective linearly polarized light rays, and the electro-controlled crystal is configured to change polarization directions of said respective linearly polarized light rays depending on an electrical signal applied thereon, so as to output the first polarization light in the form of a first linearly polarized light and the second polarization light in the form of a second linearly polarized light at different moments.

According to an exemplary embodiment of the present disclosure, the polarization light-splitting element is a polarization light-splitting medium film coated on a sheet glass, or the polarization light-splitting element comprises a pair of high-precision rectangular prisms having their respective inclined surfaces opposite to each other functioning as bonding surfaces adhered to each other, with a polarization light-splitting medium film being interposed between the bonding surfaces of the pair of high-precision rectangular prisms.

According to an exemplary embodiment of the present disclosure, the first concave reflecting element and the second concave reflecting element are two concave mirrors having different curvature radii.

According to an exemplary embodiment of the present disclosure, each of the first wave plate and the second wave plate is a quarter wave plate.

According to an exemplary embodiment of the present disclosure, the third reflecting element is a mirror.

According to an exemplary embodiment of the present disclosure, the first direction is orthogonal to the second direction.

According to an exemplary embodiment of the present disclosure, the third direction is opposite to the first direction; and the fourth direction is opposite to the second direction.

According to an exemplary embodiment of the present disclosure, a time period in which the first image to be displayed and the second image to be displayed are outputted once respectively is a display cycle, and the display cycle is less than 1/30 second.

According to another aspect of the exemplary embodiment of the present disclosure, there is provided a display method, comprising: outputting a first light ray carried with a first image and a second light ray carried with a second image alternately in timing, with a light source assembly, depending on a predetermined timing sequence; converting the first light ray carried with the first image to be displayed into a first polarization light, and converting the second light ray carried with the second image to be displayed into a second polarization light, with a first conversion element; and directing the converted first light ray originating from the first conversion element towards an imaging reflecting element in a first direction with a light-splitting assembly and then reflecting the converted first light ray with the imaging reflecting element to form the first image; and directing the converted second light ray originating from the first conversion element towards the imaging reflecting element in a second direction different from the first direction with the light-splitting assembly and then reflecting the converted second light ray with the imaging reflecting element to form the second image; the first image and the second image are located in a same direction with respect to a predetermined observation location, and the first image and the second image are located at different distances from the imaging reflecting element, respectively.

BRIEF DESCRIPTION OF THE DRAWINGS

In order to more clearly illustrate technical solutions of the embodiments of the present disclosure, the drawings required to be used with the description of the embodiments of the present disclosure will be briefly described below. It is apparent that the drawings in the following description are merely some embodiments of the present disclosure. For those skilled in the art, other drawings can be obtained according to these drawings without paying any creative efforts.

DETAILED DESCRIPTION

Figure 1:
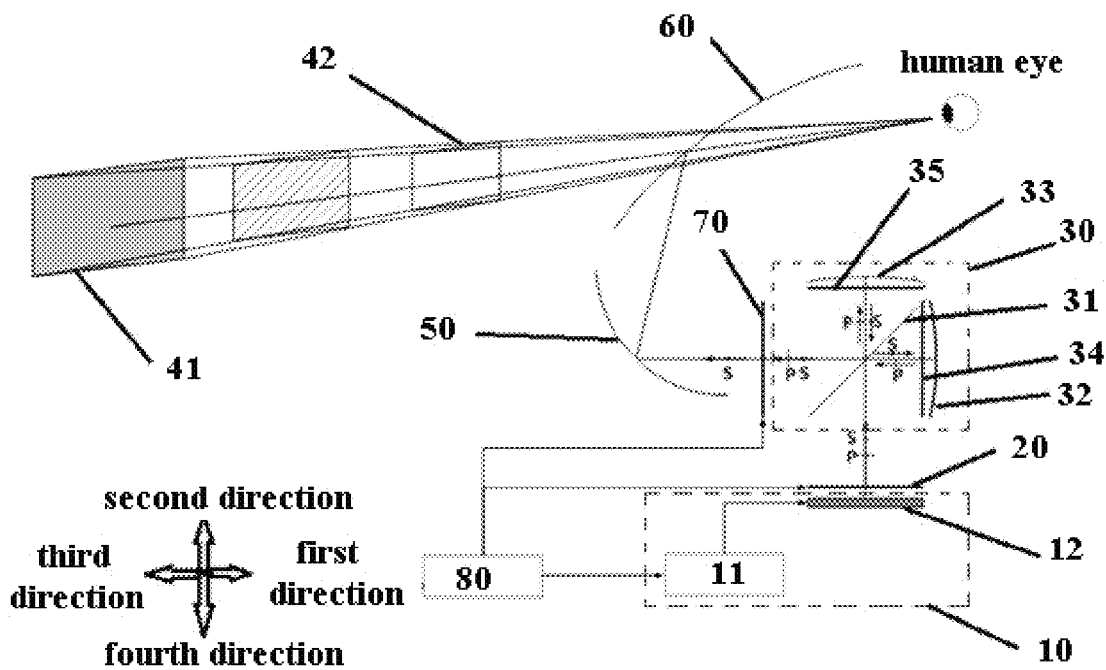
FIG. 1 illustrates a schematic structural view of a display device according to embodiments of the disclosure.

Embodiments of the present disclosure will be described in more detail below with respect to the accompanying drawings. Throughout the drawings, same elements are denoted by like reference numerals. For the sake of clarity, various parts in the figures are not drawn to scale. Moreover, some well-known parts may not be shown in the figures.

Many specific details of the embodiments of the present disclosure, such as the structures, materials, dimensions, treatment processes and techniques of the components, are described in the following in order to more clearly understand the embodiments of the present disclosure. It may easily occur to those skilled in the art that, embodiments of the present disclosure may be implemented without these specific details.

Respective dimension and shape of each component in the drawings are only intended to exemplarily illustrate the contents of the disclosure, rather than to demonstrate the practical dimension or proportion of components of a display device according to an embodiment of the disclosure.

In one aspect of embodiments of the disclosure:

As illustrated in FIG. 1, a display device is provided in embodiments of the disclosure. Specifically, according to a general technical concept of embodiments of the disclosure, in an aspect of embodiments of the disclosure, a display device is provided, which is for example a head-up display (UHD), comprising:

a light source assembly 10, configured to output a first light ray carried with a first image to be displayed and a second light ray carried with a second image to be displayed, alternately in timing, depending on a predetermined timing sequence;

a first conversion element 20, arranged at a light exiting side of the light source assembly 10, and configured to convert the first light ray which originates from the light source assembly 10 and is carried with the first image to be displayed into a first polarization light, and to convert the second light ray which originates from the light source assembly 10 and is carried with the second image to be displayed into a second polarization light; and a light-splitting assembly 30 and a imaging reflecting element 60, the light-splitting assembly 30 being configured to split light rays to direct the converted first light ray originating from the first conversion element 20 towards the imaging reflecting element 60 in a first direction, and to direct the converted second light ray originating from the first conversion element 20 towards the imaging reflecting element 60 in a second direction different from the first direction, and the imaging reflecting element 60 being configured to receive and reflect the first light ray propagating in the first direction and the second light ray propagating in the second direction so as to form the first image 41 by the first light ray and the second image 42 by the second light ray, respectively. And the first image 41 and the second image 42 are located in substantially a same direction with respect to a predetermined observation location (i.e., a location where a human eye of an observer is illustrated), and the first image 41 and the second image 42 are located at different distances from the imaging reflecting element 60, respectively.

Specifically, the light source assembly 10 in turn (i.e., alternately in timing sequence) displays the first image 41 and the second image 42. The first image 41 and the second image 42 are two virtual images different from each other and for example formed by one and the same picture (i.e., both having same contents) being imaged respectively at different distances from the imaging reflecting element 60, and practical images as desired are thereby formed collectively by fusion of the first image 41 and the second image 42 collectively. Or otherwise, the first image 41 and the second image 42 may for example alternatively be two images having different contents from each other such that the display device may display images of information overlays.

The first conversion element 20 and the light source assembly 10 cooperate with each other to convert the first light ray carried with the first image 41 into the first polarization light, and to covert the second light ray carried with the second image 42 into the second polarization light.

The light-splitting assembly 30 is configured to split the first light ray and the second light ray both of which are differently polarized, into the first polarization light carried with the first image to be displayed and the second polarization light carried with the second image to be displayed both of which travel in different optical paths, so as to form the first image 41 and the second image 42 to be presented at different positions, respectively.

In the display device according to embodiments of the disclosure, by converting the first light ray and the second light ray into differently polarized light rays, facilitating individually and subsequently adjusting properties of the first light ray and the second light ray subsequently, for example individually adjusting the first light ray and the second light ray to travel in different optical paths, so as to form the first image 41 and the second image 41 to be presented at different positions, respectively.

The expression "the first image 41 and the second image 42 are located in substantially a same direction with respect to a predetermined observation location, and the first image 41 and the second image 42 are located at different distances from the imaging reflecting element 60, respectively" means that, the first polarization light carried with the first image to be displayed and the second polarization light carried with the second image to be displayed are reflected by the imaging reflecting element 60 towards one and the same direction which is in line with the position where a human eye of an observer is located, i.e., an observation position. In other words, as illustrated, a spatial region defined by connection lines between the human eye and outermost vertices of one of the first image 41 and the second image 42 which image is located closer to the imaging reflecting element 60 may cover another spatial region defined by connection lines between the human eye and outermost vertices of the other of the first image 41 and the second image 42 which image is located farther from the imaging reflecting element 60. As such, once the observer observes from the location of the human eye towards the imaging reflecting element 60, the first image 41 and the second image 42 seem to be located in one and the same direction relative to the human eye. Therefore, once the human eye is located at the observation position, it may receive the first polarization light carried with the first image to be displayed and the second polarization light carried with the second image to be displayed, both of which originate from the imaging reflecting element 60 respectively, then, the first image 41 and the second image 42 located behind the imaging reflecting element 60 may thereby be observed (both being virtual images). And since the first polarization light carried with the first image to be displayed and the second polarization light carried with the second image to be displayed, both of which originate from the imaging reflecting element 60 respectively, have different focal lengths for imaging with respect to the human eye, then the first image 41 and the second image 42 to be formed by them respectively are located at different distances from the imaging reflecting element 60, respectively; in other words, the first image 41 and the second image 42 are located at different distances from the human eye, respectively. Therefore, if it is desired to see the first image 41 and the second image 42 clearly, it is required that focal lengths of the human eye for observing these two images are different from each other. As such, when practical images formed by fusion of the first image 41 and the second image 42 are being observed by the human eye, the focal lengths of the human eye may be adjusted in a range of focal lengths required by the first image 41 and the second image 42, respectively.

The display device according to embodiments of the disclosure may form the first image 41 and the second image 42 in one and the same direction, both of which are at different distances from the human eye; and then practical images may be formed as desired by a fusion of the first image 41 and the second image 42 (i.e., it is required that the images practically desired should have a certain range of depth-of-field (abbreviated as DOF) so as to implement a light field display. Once the observer (e.g., a driver) sees the practical images thus formed, his or her eye(s) may adjust focal length(s) thereof in a certain range, so as to relief the driver's eye fatigue. In addition, the first image 41 and the second image 42 may for example be different images which may present different information, therefore the light field display may present images of higher quality, e.g., steering information during navigation, other image overlays, and the like, facilitating enlargement of range of application of the display device.

According to embodiments of the disclosure, by way of example, the first polarization light is a first linearly polarized light having a first polarization direction, and the second polarization light is a second linearly polarized light having a second polarization direction perpendicular to the first polarization direction of the first linearly polarized light.

In other words, the first conversion element 20 may implement different functionalities at different moments.

Specifically, the first light ray carried with the first image to be displayed, and the second light ray carried with the second image to be displayed, both of which originate from the light source assembly 10, are converted into the first linearly polarized light having the first polarization direction (i.e., the first light ray in a first linearly polarized condition) and the second linearly polarized light having the second polarization direction perpendicular to the first polarization direction of the first linearly polarized light (i.e., the second light ray in a second linearly polarized condition, the second linearly polarized condition being for example orthogonal to the first linearly polarized condition), respectively, by the first conversion element 20.

Specifically, the first conversion element 20 for example comprises a linear polarizer and an electro-controlled crystal overlapping each other; as such, the light rays entering the first conversion element 20 are converted by the linear polarizer into linearly polarized light rays, and the electro-controlled crystal is configured to change respective polarization directions of said linearly polarized light rays depending on an electrical signal applied thereon, so as to output the first linearly polarized light and the second linearly polarized light at different moments, respectively.

According to embodiments of the disclosure, specifically, for example, the light-splitting assembly 30 further comprises: a polarization light-splitting element 31, which is configured to utilize light polarization effect to reflect the converted first light ray originating from the first conversion element 20 towards the first direction and to transmit the converted second light ray originating from the first conversion element 20 towards the second direction, the second direction being different from the first direction, e.g., the second direction being orthogonal to the first direction, as illustrated.

In other words, the polarization light-splitting element 31 is capable of reflecting the first linearly polarized light incident thereon and transmitting the second linearly polarized light incident thereon.

The polarization light-splitting element 31 may utilize light polarization effect to split optical paths of the first light ray and the second light ray into different paths, depending on different effects applied on the first light ray and the second light ray by polarization thereof, facilitating respective conversion of the first light ray and the second light ray thereafter so as to form the first image 41 and the second image 42 which are located differently.

Specifically, the polarization light-splitting element 31 is for example a polarization light-splitting medium film coated on a sheet glass; or the polarization light-splitting element 31 for example comprises a pair of high-precision rectangular prisms having their respective inclined surfaces opposite to each other functioning as bonding surfaces adhered to each other, with a polarization light-splitting medium film being interposed between the bonding surfaces of the pair of high-precision rectangular prisms. As such, the polarization light-splitting elements 31 are capable of transmitting the second linearly polarized light and reflecting the first linearly polarized light in a wavelength range of visible light (e.g., 420 nm~680 nm).

According to embodiments of the disclosure, for example, the light-splitting assembly 30 further comprises: a first concave reflecting element 32, configured to reflect the first light ray originating from the polarization light-splitting element 31 from the first direction towards a third direction so as to form a third light ray propagating in the third direction; and a second concave reflecting element 33, configured to reflect the second light ray originating from the polarization light-splitting element 31 from the second direction towards a fourth direction so as to form a fourth light ray propagating in the fourth direction. The first concave reflecting element 32 may for example have a curvature radius different from that of the second concave reflecting element 33.

In other words, with a reflection at the first concave reflecting element 32 (e.g., a concave mirror), the first light ray propagating in the first direction is converted into the third light ray propagating in the third direction, and with a reflection at the second concave reflecting element 33 (e.g., also a concave mirror), the second light ray propagating in the second direction is converted into the fourth light ray propagating in the fourth direction. For example, as illustrated, the third direction is opposite to the first direction, and the fourth direction is for example opposite to the second direction. And the positions of the first image 41 and the second image 42 which are finally formed may be adjusted by changing the curvature radius of each of the first concave reflecting element 32 and the second concave reflecting element 33, e.g., by choosing a concave mirror functioning as the first concave reflecting element 32 and another concave mirror functioning as the second concave reflecting element 33, both of which have different curvature radii from each other, such that the first image 41 and the second image 42 are not located at one and the same position; in other words, the first image 41 and the second image 42 are in the form of virtual images which are spatially spaced apart from each other due to respective different distances from the human eye, rather than being in the form of virtual images which spatially overlap each other.

According to embodiments of the disclosure, by way of example, the light-splitting assembly 30 further comprises: a first wave plate 34, arranged between the polarization light-splitting element 31 and the first concave reflecting element 32 in the first direction, and configured to cooperate with the first concave reflecting element 32 to convert the first light ray in the form of the first linearly polarized light (i.e., in the first linearly polarized condition) into the third light ray in the form of the second linearly polarized light (i.e., in the second linearly polarized condition which is different from, e.g., orthogonal to, the first linearly polarized condition); and a second wave plate 35, arranged between the polarization light-splitting element 31 and the second concave reflecting element 33 in the second direction, and configured to cooperate with the second concave reflecting element 33 to convert the second light ray in the form of the second linearly polarized light (i.e., in the second linearly polarized condition) into the fourth light ray in the first linearly polarized condition; the polarization light-splitting element 31 is further configured to transmit the third light ray originating from the first concave reflecting element 32 therethrough, and also configured to reflect the fourth light ray originating from the second concave reflecting element 33.

Each of the first wave plate 34 and the second wave plate 35 is for example a quarter wave plate. Specifically, a first light ray in a first linearly polarized condition originating from the polarization light-splitting element 31 above all passes through the first wave plate 34 and is converted thereby into the first light ray in a first circularly polarized condition in a rotary direction, and then is reflected at the first concave reflecting element 32 into a third light ray in a second circularly polarized condition which has its rotary direction opposite to that of the first circularly polarized condition; and the third light ray subsequently once again passes through the first wave plate 34 and is converted into the third light ray in the second linearly polarized condition.

And a second light ray in the second linearly polarized condition originating from the polarization light-splitting element 31 above all passes through the second wave plate 35 and is converted thereby into the second light ray in a third circularly polarized condition in a rotary direction (e.g., which may for example be substantially the second circularly polarized condition as above), and then is reflected at the second concave reflecting element 33 into a fourth light ray in a fourth circularly polarized condition (i.e., which may for example be substantially the first circularly polarized condition as above) which has its rotary direction opposite to that of the third circularly polarized condition; and the fourth light ray subsequently once again passes through the second wave plate 35 and is converted into the fourth light ray in the first linearly polarized condition.

A combination of the first wave plate 34 and the first concave reflecting element 32, and another combination of the second wave plate 35 and the second concave reflecting element 33 may facilitate that the whole display device becomes more compact such that the display device has a reduce volume as compared with that of a relevant UHD so as to facilitate installation thereof.

According to embodiments of the disclosure, the polarization light-splitting element 31 is for example in the form of a planar shape, and is arranged at an angle of 45° with respect to each of the first light ray and the second light ray both originating from the first conversion element 20, such that the polarization light-splitting element 31 is configured to reflect the first light ray originating from the first conversion element 20 towards the first direction, and to reflect the fourth light ray originating from the second concave reflecting element 33 towards the third direction in which the third light ray propagates (as stated above, the third direction is opposite to the first direction).

Specifically, as illustrated in FIG. 1, if each of the first wave plate 34, the second wave plate 35, and the first conversion element 20 is also in the form of a planar shape, then the polarization light-splitting element 31 is for example at an angle of 45° with respect to each of the first wave plate 34, the second wave plate 35, and the first conversion element 20, and the first wave plate 34 is at an angle of 90° with respect to the second wave plate 35. As such, the first wave plate 34 and the first concave reflecting element 32 is for example arranged as illustrated such that their respective optical axes are perpendicular to the optical axes of the second wave plate 35 and the second concave reflecting element 33.

Positional relationship between the polarization light-splitting element 31 and each of the first light ray and the second light ray makes that each of optical paths of the third light ray and the fourth light ray becomes more converged, further facilitating that the whole display device becomes more compact such that the display device has a reduced volume as compared with that of a relevant UHD so as to facilitate installation thereof.

According to embodiments of the disclosure, by way of example, the display device further comprises a third reflecting element 50, which is arranged downstream a light-exiting optical path of the light-splitting assembly 30 between the light-splitting assembly 30 and the imaging reflecting element 60, and is configured to reflect the third light ray and the fourth light ray both originating from the polarization light-splitting element 31 to the imaging reflecting element 60.

The third reflecting element 50 is for example an ordinary mirror. The third reflecting element 50 is provided, mainly intending to change optical paths of the third light ray and the fourth light ray. On one hand, the third reflecting element 50 is configured to receive downstream the light-splitting assembly 30 the third light ray and the fourth light ray exiting at the light-splitting assembly 30; on the other hand, the third reflecting element 50 is configured to adjust the light-exiting optical paths of the third light ray and the fourth light ray with their reflection, such that the volume of the whole display device is as small as possible so as to facilitate installation thereof.

According to embodiments of the disclosure, by way of example, the display device further comprises a second conversion element 70, which is for example arranged between the light-splitting assembly 30 and the third reflecting element 50 and is configured to convert the third light ray in the second linearly polarized condition, which originates from the polarization light-splitting element 31, into the third light ray in the first linearly polarized condition (i.e., in the same condition as the fourth light ray in the first linearly polarized condition); and by way of example, the first linearly polarized condition is s polarization and the second linearly polarized condition is p polarization, with respect to the imaging reflecting element.

In other words, once the first linearly polarized light and the second linearly polarized light irradiate on and are reflected by the imaging reflecting element 60, since the polarization direction of the first linearly polarized light is parallel to a plane where both incident light and reflected light thereof are located, then the first linearly polarized light is a s polarization light; and since the polarization direction of the second linearly polarized light is perpendicular to the plane where both incident light and reflected light thereof are located, then the second linearly polarized light is a p polarization light.

Figure 2:
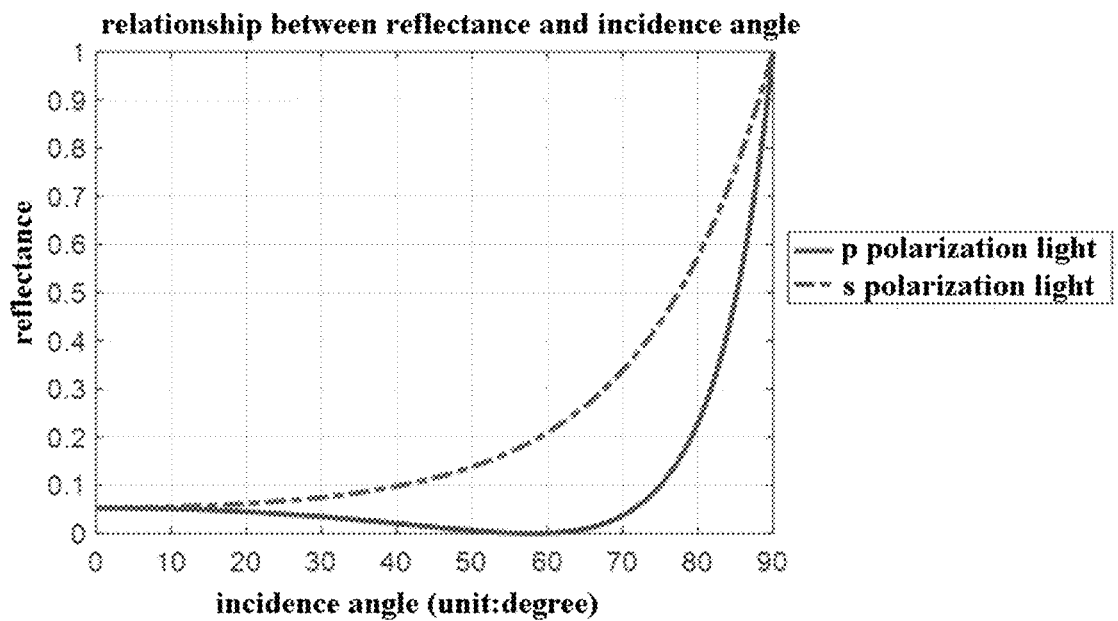
FIG. 2 illustrates a relationship between reflectance of both s polarization light and p polarization light and the incidence angle.

As illustrated in FIG. 2, based on basic properties of polarization light, a reflectance of the s polarization light on the imaging reflecting element 60 is different from that of the p polarization light on the imaging reflecting element 60; specifically, the reflectance of the s polarization light on the imaging reflecting element 60 is larger than that of the p polarization light on the imaging reflecting element 60. Since light which is reflected by the imaging reflecting element 60 into the human eye functions as light for practical imaging, then, if equal amount of the s polarization light and the p polarization light irradiate onto the imaging reflecting element 60, then reflected p polarization light may be less than reflected s polarization light; in other words, the portion of the p polarization light which enters the human eye is less than the portion of the s polarization light which enters the human eye. As such, an image formed by the p polarization light has a lower luminescence than that of an image formed by the s polarization light, affecting effect of practical images.

Especially, in a condition that the imaging reflecting element 60 is a front windshield glass of a vehicle, then an incidence angle of each of the third light ray and the fourth light ray onto the front windshield glass may typically be in a range of 60° to 70°, and the reflectance of the s polarization on the front windshield glass is much larger than the reflectance of the p polarization on the front windshield glass (for example, in a condition that the incidence angle is 60°, the reflectance of the s polarization light is 0.2, and the reflectance of the p polarization light is 0), then an image formed by the s polarization light has its luminescence much larger than that of an image formed by the p polarization light.

Therefore, for example, the second conversion element 70 may be set to convert the third light ray, which would have travelled directly towards the third reflecting element 50, from its original second linearly polarized condition (i.e., p polarization condition) into the first linearly polarized condition (i.e., s polarization), such that both the third light ray being incident onto the imaging reflecting element 60 and the fourth light ray being incident onto the imaging reflecting element 60 are s polarization light; and then, on one hand, it may ensure that the first image 41 formed by the third light ray and the second image 42 formed by the fourth light ray have substantially consistent luminescence, improving the driver's comfort in observing the practical images, and on the other hand, it may ensure that the practical images are presented at a maximal luminescence thereof as much as possible, such that the practical images formed by the fusion of the first image 41 and the second image 42 may be clearer.

In addition, the display device according to embodiments of the disclosure may for example be the head up display as used in a vehicle, and may image by using the front windshield glass of the vehicle to function as the imaging reflecting element, such that the driver can see the information of automotive instruments or other information without lowering head to observe the automotive instructions, facilitating avoiding any traffic accident caused by the driver looking down to observe the automotive instruments.

According to embodiments of the disclosure, for example, the light source assembly 10 specifically comprises: an image rendering unit 11, configured to generate the first image 41 to be displayed depending on datum of the first image, and to generate the second image 42 to be displayed depending on datum of the second image; and a display unit 12, arranged to be connected with the image rendering unit 11, and configured to cooperate with the image rendering unit 11 to output the first light ray carried with the first image to be displayed and the second light ray carried with the second image to be displayed, alternately in time sequence.

The datum of the first image 41 and the datum of the second image 42 may for example be datum in the instruments of the vehicle, datum of steering information during navigation, or other datum required for the driving of the vehicle. The image rendering unit 11 and the display unit 12 may for example be connected with a control unit 80 of the display device, respectively.

Figure 3:
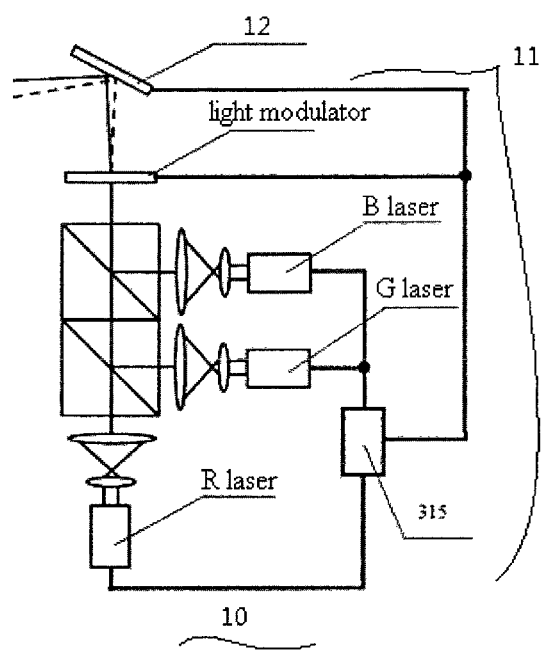
FIG. 3 illustrates a schematic structural view of a light source assembly 10 of the display device according to embodiments of the disclosure.

By way of example, as illustrated in FIG. 3, the image rendering unit 11 may for example be a display control circuit connected with the control unit 80 of the display device, and is configured to be instructed by the control unit 80 to generate image information of both the first image to be displayed and the second image to be displayed.

The display unit 12 for example comprises: a light source configured to emit light rays; a light modulator arranged in a direction in which the emitted light rays propagates and configured to modulate the emitted light rays alternately in timing sequence at two different deflection angles to generate the first light ray and the second light ray which are projected alternately in timing sequence in different directions after the emitted light rays transmit through the light modulator; and a display panel (e.g., reflective display panel) arranged downstream the light modulator and configured to be controlled by the control unit to load image information onto the first light ray and the second light ray projected onto the display panel alternately in timing sequence in different directions so as to form the first light ray carried with the first image and the second light ray carried with the second image.

More specifically, the light source may for example be a laser, comprising three colors lasers of a red laser, a green laser and a blue laser. The light modulator is for example a spatial light modulator comprising one of following: a DKDP (i.e., Potassium Dideuterium Phosphate) device utilizing Pockels' effect, a PROM (i.e., Pockels' readout optical modulator) device utilizing Pockels' effect, a liquid crystal light valve utilizing hybrid field effect, or a thermoplastic recording medium utilizing surface deformation or a photoconductive thermoplastic recording medium, or the like. And the reflective display is for example one of following: a DLP (Digital Light Processing) display or an Lcos (Liquid Crystal ON Silicon) display, etc.

According to embodiments of the disclosure, a time period in which the first image to be displayed and the second image to be displayed are outputted once respectively is a display cycle, and the display cycle is less than 1/30 second.

Since a response time of the human eye to images is larger than 1/30 second, then, in a condition that one display cycle in which the first image to be displayed and the second image to be displayed are outputted alternately once is less than 1/30 second, although two images are displayed sequentially in the display cycle (i.e., the first image 41 and the second image 42), the human eye may see such two images within the display cycle so that a practical image is formed by fusion of these two images depending on known visual retention effect.

A specific process of the display device according to embodiments of the disclosure for forming practical images may for example be as follows:

A image rendering unit 11 generates the first image to be displayed on the basis of the datum of the first image 41, and generates the second image to be displayed on the basis of the datum of the second image 42, and conveys/transfers the first image to be displayed and the second image to be displayed respectively to a display unit 12.

In a first time sequence of one display cycle, the display unit 12 transfers the first light ray carried with the first image to be displayed as formed above to a first conversion element 20, and the first light ray carried with the first image to be displayed is then converted into a first linearly polarized light at the first conversion element 20, i.e., the first light ray in a first linearly polarized condition then propagates towards a polarization light-splitting element 31; the first light ray in the first linearly polarized condition is reflected towards the first direction by the polarization light-splitting element 31, and in turn transmits through a first wave plate 34 and is then incident on a first concave reflecting element 32; the first light ray in the first linearly polarized condition is converted by the first wave plate 34 and the first concave reflecting element 32 into a third light ray in a second linearly polarized condition propagating in a third direction (e.g., opposite to the first direction) and in turn transmits through the polarization light-splitting element 31 and subsequently propagates towards a second conversion element 70; the third light ray in the second linearly polarized condition then transmits through the second conversion element 70 and is reflected by a third reflecting element 50 to an imaging reflecting element 60 to form the first image 41.

In a second time sequence of one display cycle, the display unit 12 transfers the second light ray carried with the second image to be displayed as formed above to a first conversion element 20, and the second light ray carried with the second image to be displayed is then converted into a second linearly polarized light at the first conversion element 20, i.e., the second light ray in a second linearly polarized condition then propagates towards a polarization light-splitting element 31; and the second light ray in the second linearly polarized condition transmits through the polarization light-splitting element 31 in a second direction, and in turn transmits through a second wave plate 35 and is then incident on a second concave reflecting element 33; the second light ray in the second linearly polarized condition is converted by the second wave plate 35 and the second concave reflecting element 33 into a fourth light ray in the first linearly polarized condition propagating in a fourth direction (e.g., opposite to the second direction) and in turn propagates towards the polarization light-splitting element 31; the fourth light ray in the second linearly polarized condition is reflected towards the third direction by the polarization light-splitting element 31 and subsequently propagates towards the second conversion element 70; the fourth light ray in the second linearly polarized condition is then converted into a fourth light ray in the first linearly polarized condition by the second conversion element 70, and is subsequently reflected by the third reflecting element 50 to the imaging reflecting element 60 to form the second image 42.

The first image 41 and the second image 42 located differently from each other in the first direction are fused with each other to form practical image(s).

In another aspect of embodiments of the disclosure:

According to a general technical concept of embodiments of the disclosure, in another aspect of embodiments of the disclosure, a display method is provided, e.g., a display method of the display device according to above embodiments of the disclosure, the method comprising:

S10, outputting a first light ray carried with a first image to be displayed and a second light ray carried with a second image to be displayed alternately in timing, with a light source assembly, depending on a predetermined timing sequence;

S20, converting the first light ray carried with the first image to be displayed into a first polarization light, and converting the second light ray carried with the second image to be displayed into a second polarization light, with a first conversion element; and S30, directing the converted first light ray originating from the first conversion element towards an imaging reflecting element in a first direction with a light-splitting assembly and then reflecting the converted first light ray with the imaging reflecting element to form the first image; and directing the converted second light ray originating from the first conversion element towards the imaging reflecting element in a second direction different from the first direction with the light-splitting assembly and then reflecting the converted second light ray with the imaging reflecting element to form the second image; wherein the first image and the second image are located in a same direction with respect to a predetermined observation location, and the first image and the second image are located at different distances from the imaging reflecting element, respectively.

The display method according to embodiments of the disclosure may form the first image and the second image located differently from each other, and then the first image and the second image are fused with each other to form practical image(s) as desired; in other words, the images practically desired should have a certain range of depth-of-field (abbreviated as DOF) so as to implement a light field display. Once the driver sees the practical images thus formed, his or her eye(s) may adjust focal length(s) thereof in a certain range, so as to relief the driver's eye fatigue. In addition, the first image and the second image may for example be different images which may present different information, therefore the light field display may present images of higher quality, e.g., steering information during navigation, other image overlays, and the like, facilitating enlargement of range of application of the display device.

As compared with relevant art, on the basis of above technical solutions, the display device and the display method according to embodiments of the disclosure at least have beneficial effects as below:

The display device and the display method according to embodiments of the disclosure may at least partially solve a problem that an UHD image in the relevant art is a planar image so as to result in eye fatigue of a driver due to long time observation of the UHD image and a portion of information may fail to be presented.

It should be noticed that in this disclosure, relationship terminologies such as first, second and the like are used, merely intending to distinguish one entity or operation from another entity or operation, without necessarily requiring or implying any such actual relationship or order between these entities or operations. Moreover, the term "comprise/comprising", "contain/containing" or any other variation thereof may be intended to cover non-exclusive inclusions, such that a process, method, item or device each of which includes a series of elements, may comprise not only those elements, but also other elements that are not explicitly listed, or elements inherently exist in such a process, method, item or device. In the absence of further restrictions, any element defined by the statement "comprise/comprising a/one . . . " may not exclude the existence of other identical elements in processes, methods, goods or equipment that include elements.

According to embodiments of the present disclosure, as described above, these embodiments neither set forth all the details, nor do they limit the disclosure to only the specific embodiments described above. It is apparent that, according to the above description, various modifications and variations can be made thereto. These embodiments are selected and described in detail in this specification so as to better explain or interpret principles and practical applications of the present disclosure, such that those skilled in the art can make good use of the present disclosure and modify it on the basis of the present disclosure. This disclosure is limited merely by the claims and a full scope thereof and equivalents thereof.

What is claimed is:

1. A display device, comprising:
   a light source assembly, configured to output a first light ray carried with a first image to be displayed and a second light ray carried with a second image to be displayed, alternately in timing, depending on a predetermined timing sequence;
   a first conversion element, arranged at a light exiting side of the light source assembly, and configured to convert the first light ray which originates from the light source assembly and is carried with the first image to be displayed into a first polarization light, and to convert the second light ray which originates from the light source assembly and is carried with the second image to be displayed into a second polarization light; and
   a light-splitting assembly and a imaging reflecting element, the light-splitting assembly being configured to split light rays to direct the converted first light ray originating from the first conversion element towards the imaging reflecting element in a first direction, and to direct the converted second light ray originating from the first conversion element towards the imaging reflecting element in a second direction different from the first direction, and the imaging reflecting element being configured to receive and reflect the first light ray propagating in the first direction and the second light ray propagating in the second direction so as to form the first image by the first light ray and the second image by the second light ray, respectively;
   wherein the first image and the second image are located in a same direction with respect to a predetermined observation location, and the first image and the second image are located at different distances from the imaging reflecting element, respectively,
   wherein the first polarization light is a first linearly polarized light and the second polarization light is a second linearly polarized light having a polarization direction perpendicular to that of the first linearly polarized light,
   wherein the light-splitting assembly further comprises: a polarization light-splitting element, which is configured to reflect the converted first light ray originating from the first conversion element in the first direction and to transmit the converted second light ray originating from the first conversion element in the second direction,
   wherein the light-splitting assembly further comprises:
      a first concave reflecting element, configured to reflect the first light ray originating from the polarization light-splitting element from the first direction towards a third direction so as to form a third light ray propagating in the third direction;
      a second concave reflecting element, configured to reflect the second light ray originating from the polarization light-splitting element from the second direction towards a fourth direction so as to form a fourth light ray propagating in the fourth direction, and
   wherein the first concave reflecting element has a curvature radius different from that of the second concave reflecting element.

2. The display device according to claim 1, wherein the light-splitting assembly further comprises:
   a first wave plate, arranged between the polarization light-splitting element and the first concave reflecting element in the first direction, and configured to cooperate with the first concave reflecting element to convert the first light ray in a first linearly polarized condition into the third light ray in a second linearly polarized condition;
   a second wave plate, arranged between the polarization light-splitting element and the second concave reflecting element in the second direction, and configured to cooperate with the second concave reflecting element to convert the second light ray in the second linearly polarized condition into the fourth light ray in the first linearly polarized condition, and
   wherein the polarization light-splitting element is further configured to transmit the third light ray originating from the first concave reflecting element therethrough, and also configured to reflect the fourth light ray originating from the second concave reflecting element.

3. The display device according to claim 2, wherein the polarization light-splitting element is in the form of a planar shape, and is arranged at an angle of 45° with respect to each of the first light ray and the second light ray both originating from the first conversion element, and configured to reflect the fourth light ray originating from the second concave reflecting element towards the third direction of the third light ray.

4. The display device according to claim 3, further comprising:
a third reflecting element, configured to reflect the third light ray and the fourth light ray both originating from the polarization light-splitting element to the imaging reflecting element.

5. The display device according to claim 4, wherein the third reflecting element is a mirror.

6. The display device according to claim 3, further comprising:
a second conversion element, configured to convert the third light ray in the second linearly polarized condition, which originates from the polarization light-splitting element, into the third light ray in the first linearly polarized condition;
wherein the first linearly polarized condition is s polarization and the second linearly polarized condition is p polarization, with respect to the imaging reflecting element.

7. The display device according to claim 2, wherein each of the first wave plate and the second wave plate is a quarter wave plate.

8. The display device according to claim 1, wherein the imaging reflecting element is a front windshield glass of a vehicle.

9. The display device according to claim 1, wherein the light source assembly comprises:
an image rendering unit, configured to generate the first image to be displayed depending on datum of the first image, and to generate the second image to be displayed depending on datum of the second image; and
a display unit, arranged to be connected with the image rendering unit, and configured to output the first light ray carried with the first image to be displayed and the second light ray carried with the second image to be displayed, alternately in time sequence.

10. The display device according to claim 1, wherein the first conversion element comprises a linear polarizer and an electro-controlled crystal overlapping each other, the linear polarizer is configured to convert the first light ray and the second light ray, each of which is incident on the first conversion element respectively, into respective linearly polarized light rays, and the electro-controlled crystal is configured to change polarization directions of said respective linearly polarized light rays depending on an electrical signal applied thereon, so as to output the first polarization light in the form of a first linearly polarized light and the second polarization light in the form of a second linearly polarized light at different moments.

11. The display device according to claim 1, wherein the polarization light-splitting element is a polarization light-splitting medium film coated on a sheet glass, or
wherein the polarization light-splitting element comprises a pair of rectangular prisms having their respective inclined surfaces opposite to each other functioning as bonding surfaces adhered to each other, with a polarization light-splitting medium film being interposed between the bonding surfaces of the pair of rectangular prisms.

12. The display device according to claim 1, wherein the first concave reflecting element and the second concave reflecting element are two concave mirrors having different curvature radii.

13. The display device according to claim 1, wherein a time period in which the first image to be displayed and the second image to be displayed are outputted once respectively is a display cycle, and the display cycle is less than $\frac{1}{30}$ second.

14. A display method, comprising:
outputting a first light ray carried with a first image and a second light ray carried with a second image alternately in timing, with a light source assembly, depending on a predetermined timing sequence;
converting the first light ray carried with the first image to be displayed into a first polarization light, and converting the second light ray carried with the second image to be displayed into a second polarization light, with a first conversion element; and
directing the converted first light ray originating from the first conversion element towards an imaging reflecting element in a first direction with a light-splitting assembly and then reflecting the converted first light ray with the imaging reflecting element to form the first image; and
directing the converted second light ray originating from the first conversion element towards the imaging reflecting element in a second direction different from the first direction with the light-splitting assembly and then reflecting the converted second light ray with the imaging reflecting element to form the second image,
wherein the first image and the second image are located in a same direction with respect to a predetermined observation location, and the first image and the second image are located at different distances from the imaging reflecting element, respectively,
wherein the first polarization light is a first linearly polarized light and the second polarization light is a second linearly polarized light having a polarization direction perpendicular to that of the first linearly polarized light,
wherein the light-splitting assembly further comprises: a polarization light-splitting element, which is configured to reflect the converted first light ray originating from the first conversion element in the first direction and to transmit the converted second light ray originating from the first conversion element in the second direction,
wherein the light-splitting assembly further comprises:
a first concave reflecting element, configured to reflect the first light ray originating from the polarization light-splitting element from the first direction towards a third direction so as to form a third light ray propagating in the third direction;
a second concave reflecting element, configured to reflect the second light ray originating from the polarization light-splitting element from the second direction towards a fourth direction so as to form a fourth light ray propagating in the fourth direction, and
wherein the first concave reflecting element has a curvature radius different from that of the second concave reflecting element.

* * * * *